United States Patent [19]

Volcani

[11] Patent Number: 5,033,528

[45] Date of Patent: Jul. 23, 1991

[54] PERSONAL PORTABLE SUNSHADE

[76] Inventor: Yanon Volcani, 305 Bird Rock Ave., La Jolla, Calif. 92037

[21] Appl. No.: 463,417

[22] Filed: Jan. 11, 1990

[51] Int. Cl.⁵ .............................................. A47G 5/00
[52] U.S. Cl. ................... 160/351; 160/370.2; 248/126; 296/97.9; 403/56; 403/122
[58] Field of Search .............. 160/351, 370.2, DIG. 2, 160/DIG. 3; 248/126, 231.5, 288.5, 276, 160; 403/56, 90, 122; 296/97.1, 97.5, 97.7, 97.8, 97.9

[56] References Cited

U.S. PATENT DOCUMENTS

| | | | |
|---|---|---|---|
| 599,543 | 2/1898 | Whitaker | 248/160 |
| 936,379 | 10/1909 | Stevens | 248/276 |
| 1,170,235 | 2/1916 | Fox | 248/276 X |
| 1,224,431 | 5/1917 | Van Vorst | 248/160 X |
| 1,258,107 | 3/1918 | Geist | 296/97.1 |
| 1,279,803 | 9/1918 | Watson | 248/160 |
| 1,313,083 | 8/1919 | Geist | 296/97.7 X |
| 1,719,154 | 7/1929 | Wetherbee et al. | 296/97.7 X |
| 1,806,059 | 5/1931 | Hoople | 248/276 |
| 1,989,437 | 1/1935 | Weisz | 248/160 X |
| 2,481,271 | 9/1949 | Willey | 248/160 X |
| 2,597,670 | 5/1952 | Pinto | 248/160 X |
| 4,044,725 | 8/1977 | Miller | 403/122 X |
| 4,648,733 | 3/1987 | Merkt | 403/56 |

Primary Examiner—David M. Purol
Attorney, Agent, or Firm—Brown, Martin, Haller and McClain

[57] ABSTRACT

A portable sunshade comprising a disc having a surface area sufficient for shading a particular portion of a user's body, which disc is supported at its edge by a flexible extension that is connected to a rigid extension that in turn is connected to a lamp or suitable supporting device. The flexible section of the extension comprises innerconnecting, individual units; similar to pop beads, that provide a rotating, bendable gooseneck connection that may be lengthened and/or shortened, or that may be connected directly to the clamp. The clamp, clamps the sunshade to a lounge chair or the like, allowing the disc to be positioned to shade the user's face.

8 Claims, 2 Drawing Sheets

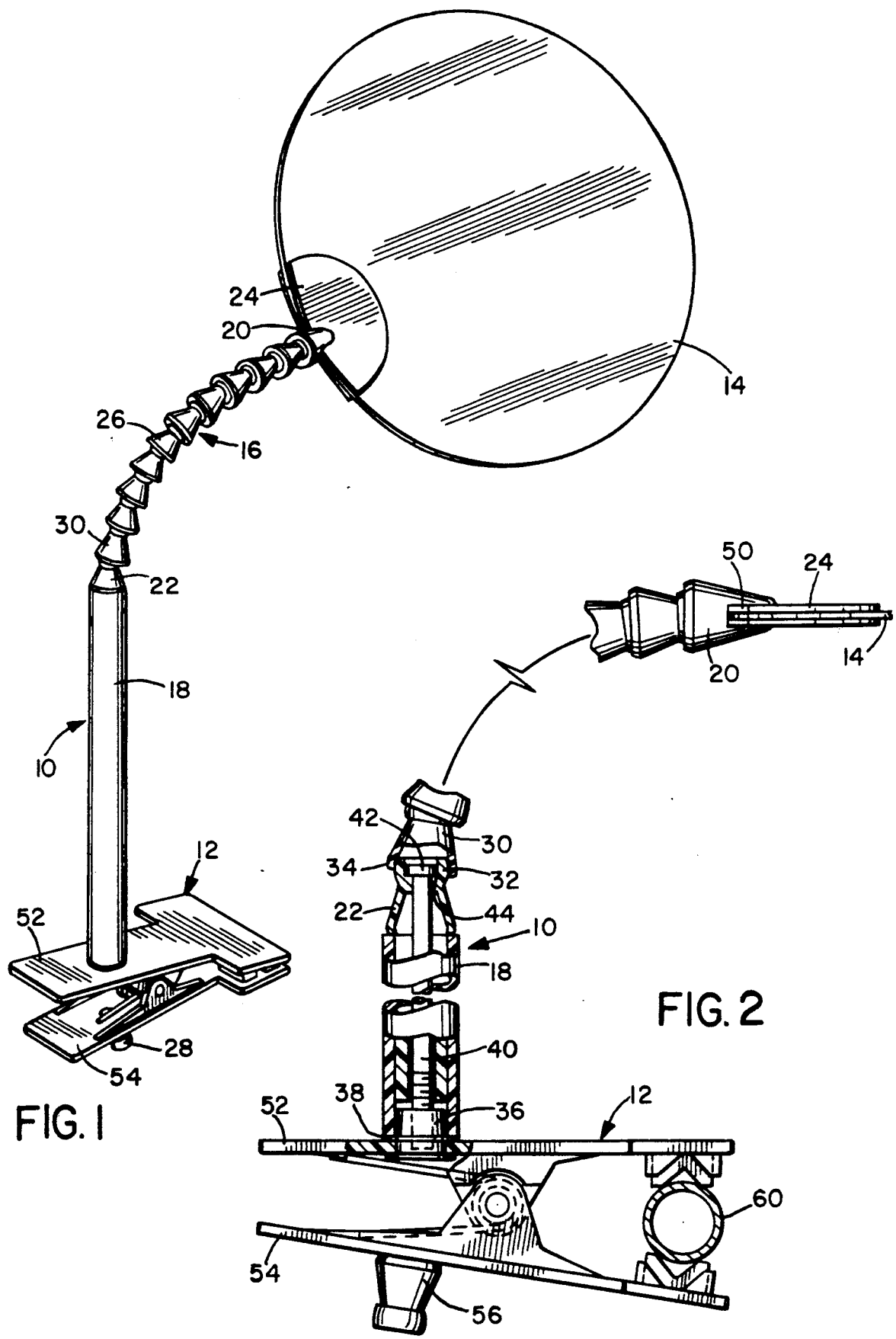

PERSONAL PORTABLE SUNSHADE

BACKGROUND OF THE INVENTION

It is common for persons to relax in the sun, to sunbathe at beaches, near the pool, or even sitting in one's automobile. Yet it is not always desirable in sun-bathing to have the sun beam directly onto the body's sensitive facial areas. It is widely recognized that the sun has harmful rays that can damage one skin's or irritate one's eyes. So, while sunbathers are willing to have their bodies tanned, they are less likely today to want their faces tanned. Further in reading in the sun when sunbathing, the sun creates a glare to ones eyes that makes reading uncomfortable. Where children are sitting in the sun, it is generally recognized as being desirable to keep the sun off of their faces. So there is a need recognized by the inventor, to provide a new and unique sunshade for particularly shading the facial features from the sun's harmful rays, while allowing unlimited hours of outdoor comfort when sitting in a vehicle, or on a lounge, or just resting on a towel at the beach.

SUMMARY OF THE INVENTION

The present invention comprises a portable sunshade. This sunshade is a unique, adjustable, lightweight device that protects the sensitive body areas, particularly the facial areas, from the suns harmful rays, while allowing glare-free comfort for outdoor reading and relaxing. The sunshade has a disc that is sized to provide shading of the face of a user. The disc is connected to a support by an extension. The extension has a rigid portion and a flexible gooseneck-type portion. The end of the gooseneck portion is connected to the side of the disc and the other end of the rigid portion is secured to the support. The support may comprise a clamp, stand, or other suitable support means.

The clamp generally secures the lightweight sunshade onto, for example, a chaise lounge. The flexible portion of the extension allows the disc to be swiveled from the clamped position and moved to correctly position the disc between the sun and the user's face. As the sun moves, the user doesn't. Rather, the disc is moved on the flexible section of the extension.

The flexible portion of the extension is capable of bending movement as well as rotating movement, so that the disc may be rotated or moved radially relative to the support. In a preferred embodiment the flexible section generally comprises interconnecting, individual, separable units that can have the configuration of pop beads. Accordingly, sections may be removed or inserted in the flexible section thus increasing or decreasing its length. Further, the flexible section can be separated from the rigid section and connected directly to the support means, allowing further flexible use and positioning of the shading disc relative to the support, so that the disc can be located between the sun and the user's face, and can be subsequently easily moved to track the sun.

It is therefore an object of this invention to provide a new and improved, flexible, portable and adjustable lightweight sunshade that is connectable to various common structures and can be easily positioned to shade the users face or other portions of the body, and yet is not connected to and is not responsive to movement of the user.

Other objects and many attended advantages of this invention will become more apparent upon a reading of the following detailed description and an examination of the drawings, wherein like parts designate like structures throughout and in which:

FIG. 1 is a perspective view of the basic configuration of adjustable sun shade, FIG. 2 is an enlarged side elevation view of the structure, partially cut away;

FIG. 3 illustrates the use of the sunshade on a lawn chair or the like;

Figure 3:
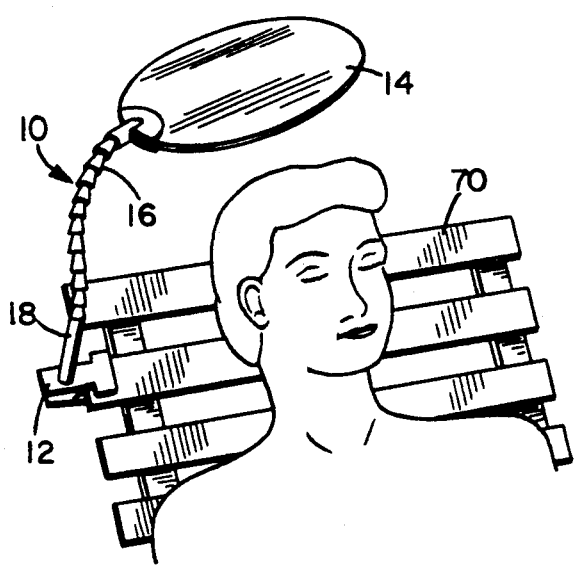
Figure 4:
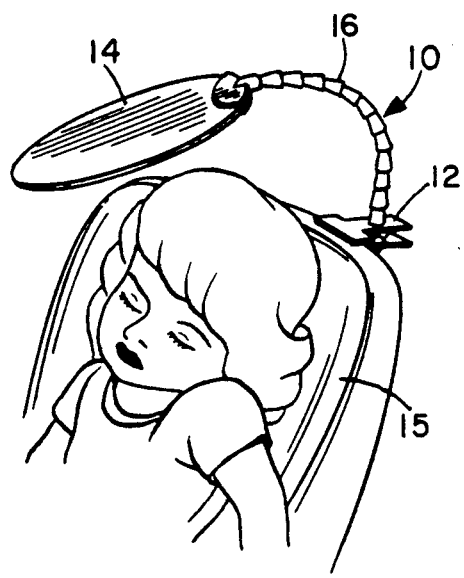
FIG. 4 illustrates a shortened configuration of the sunshade mounted on a child's seat.

Referring now to FIGS. 1 and 2, the personal, portable sunshade 10 comprises disc 14 that is secured to a flexible section 16 of an extension. Flexible section 16 in turn is connected to a rigid section 18 of the extension, that is connected to a support 12, which in FIGS. 1 and 2 is a clamp. Referring to FIGS. 3 and 4, the clamp 12 is secured to a suitable support such as a lounge 70 in FIG. 3 and to a child's seat 15 in FIG. 4. Both connections are such that the flexible portion 16, which is capable of bending in a 360 degree movement and being rotatable, allows the sunshield 14 to be located between the user and the sun, as illustrated.

The sunshade 14 comprises a disc that may be made of plastic or other suitable material. Disc 14 has a sufficient area to shade the face when positioned between the sun and the users face. While other portions of the body may be shielded by sunshield 14, the sunshield will generally be used to shield the body's sensitive facial area. The shield or shade has a thickened semi-circular portion 24 on one side, to which is attached a connector 20. Connector 20 is one end of one of the interconnected, individual, separable units 26. A cross section of one of these units is illustrated in FIG. 2, and has an upper half-cylindrical portion 32 that fits into a cylindrical recessed portion 34. The inner diameter of end 34 is smaller than the outer diameter of the upper end 32, and since the units are made of plastic, end 34 snaps in the known manner over end 32, making a resilient connection. This connection allows swivelling in 360 degrees and also is rotatable. Each one of the units 26 are similarly constructed and are similarly mated. It may thus be understood that the gooseneck flexible section 16 allows the disc 14 to be moved universally relative to the rigid section 18 or the supporting clamp 12, or be rotated relative thereto. This provides virtually universal movement of the sun-shield relative to the user.

The rigid section 18 in the embodiment is a tubular member that may be made of plastic or other suitable material. This member 18 is connected to moveable side arm 52 of clamp 12, and has a nut 36 for receiving a threaded bolt 40. The individual units 26 each have an opening 44 therethrough, and accordingly bolt 40 is passed through that opening with the head thread 42 resting against the rim of the opening thus securing the upper end 22 of the innerconnecting units to the top of the tube 18. The other end 38 of tube 18 abuts against the side of the upper arm 52 of clamp 12.

The other arm 54 of support clamp 12 has connected thereto one portion 56 of one of the interconnected units.

Thus, the flexible section 16 at its unit 30 may be separated from unit part 22 connected to the tube 18, and then connected directly to the other unit connector 56. The tube 18 is then removed from the side of arm 52 of the clamp 12 by unscrewing bolt 40 from its connection to nut 36. In this configuration, flexible unit 16 is then secured in operating position by clamp 12 in the manner illustrated in FIG. 4. As illustrated in FIG. 2, the clamp may be connected to tubular member 60 that may be secured to the top of a chaise lounge, or other suitable tubular support.

Figure 5:
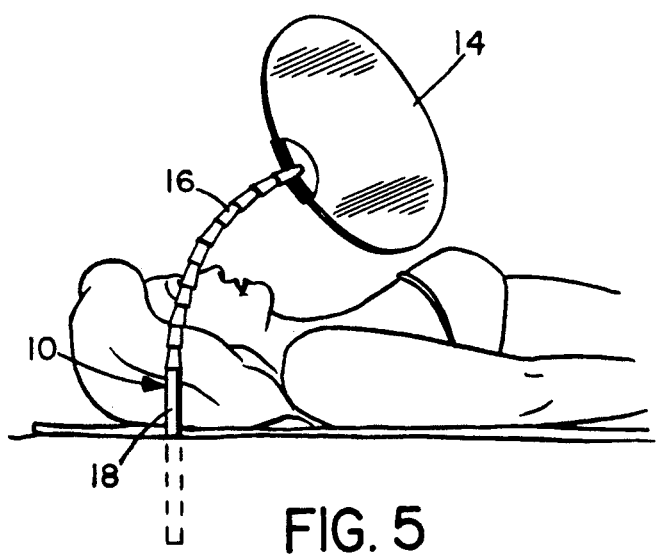
FIG. 5 illustrates the sunshade secured in the ground where no structural support is available.

In operation, the sunshade in its configuration in FIG. 1, would be used as illustrated in FIG. 3. In FIG. 4, the sunshade is used with rigid tubular member 18 removed, and the flexible extension connected to unit 56 on side 54 of the clamp support 12. In FIG. 5, clamp 12 is disconnected from tube 18 by unscrewing bolt 40 from nut 36, and then projected the end of tube 18 into the sand to provide support for the sunshield, such as for use at the beach, or in other similar applications.

Figure 6:
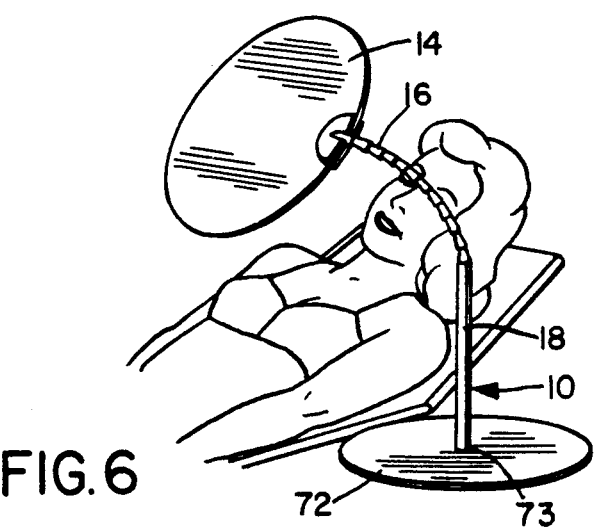
FIG. 6 illustrates the sunshade supported on a flat stand.

FIG. 6 illustrates use of the sunshield with the rigid member 18 being removed from clamp 12 and inserted into a flat stand 72, to which it is secured through a threaded connection 73.

It will be apparent from the foregoing that changes may be made in the details of the construction and configuration described herein, without departing from the spirit of the invention.

Having disclosed my invention, I now claim:

1. A personal portable sunshade for shading a portion of a user's body, such as the face, from the sun comprising;
    a shading disc having a surface area sized for shading a portion of the user's body, such as the facial area;
    a support with an extension connected to the disc for supporting the disc;
    said extension having a flexible section that is bendable and rotatable to position the disc relative to the support, to shade the face;
    said extension has a rigid section that is connected to the end of the flexible section;
    and said flexible section comprising a plurality of interconnected, individual, separable units that are selectively separable to shorten or lengthen the extension.

2. A personal portable sunshade as claimed in claim 1 in which;
    said rigid section being connected at one end to said support and the other end to the end of said flexible section opposite the shading disc.

3. A personal portable sunshade as claimed in claim 2 including;
    connection means for releasably connecting said rigid section to said support and to said flexible section, wherein said rigid section may be selectively removed from said extension and said flexible connection connected directly to said support.

4. A personal portable sunshade as claimed in claim 3 in which;
    said support comprising a clamp that through said connection means is connected to said rigid section; and
    a portion of one of said separable units being connected to said clamp for connecting said clamp to said flexible section.

5. A personal portable sunshade as claimed in claim 3 in which;
    said support comprising a flat stand for receiving and supporting said rigid section of said extension.

6. A personal portable sunshade as claimed in claim 3 in which;
    said interconnecting units comprising plastic pop beads.

7. A personal portable sunshade as claimed in claim 6 in which;
    said disc being connected at one side edge to the free end of said flexible connection with the disc surface being substantially parallel with the connection.

8. A personal portable sunshade as claimed in claim 7 in which;
    one element of said pop beads being directly connected to the side edge of said disc, forming the connection of the disc with the flexible section.

* * * * *